May 26, 1931.   H. L. JOHNSTON   1,807,574
MEAT GRINDER
Filed Dec. 26, 1923
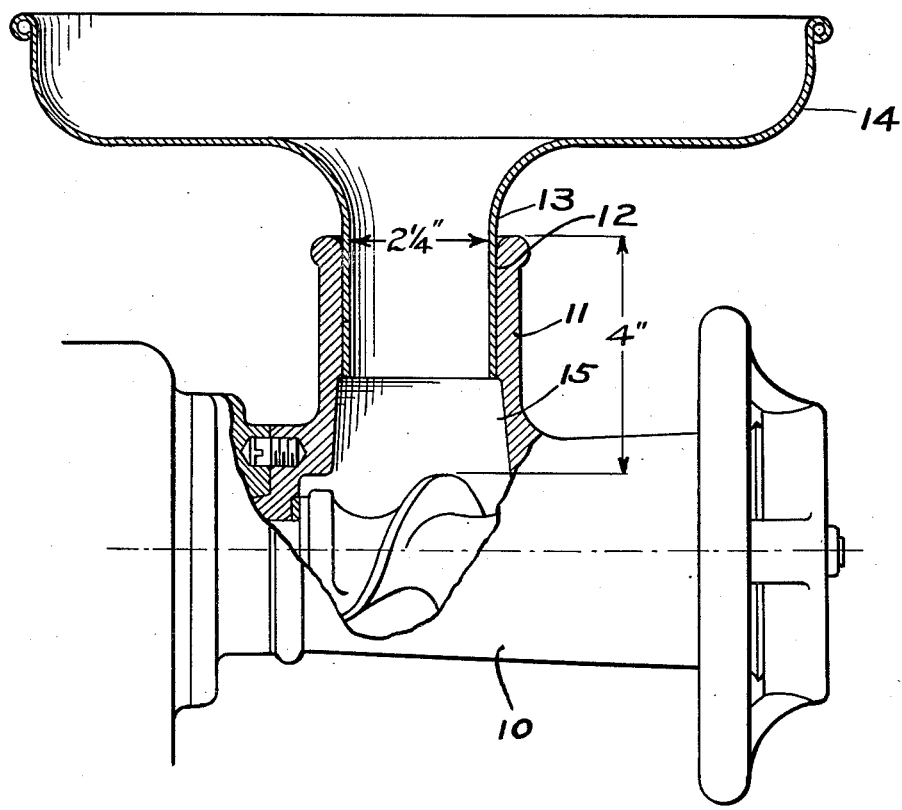
INVENTOR.
Hubert L. Johnston
BY
ATTORNEYS.

Patented May 26, 1931

1,807,574

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO

MEAT GRINDER

Application filed December 26, 1923. Serial No. 682,688.

This invention relates to meat grinders, and more particularly to motor driven meat grinders.

Meat grinders, both motor driven and manually operated, have been used for many years. But all meat grinders heretofore used have been objectionable because so constructed that many injuries to the operators thereof have occurred. This has been particularly true with motor driven meat grinders, of course, and it has been not an uncommon occurrence in stores, restaurants, and the like places, using these comparatively larger motor driven devices, for operators to have one or more fingers cut off during operation through accidentally getting the fingers into the worm as the meat is being fed into the device for grinding. And a number of very deplorable accidents have happened in which children, whose hands are naturally small, have lost a whole hand through sticking the hand into the worm while the machine is operating.

The principal object of the present invention, is to provide a meat grinder which is so constructed that the possibility of accidents of this character is minimized, and which at the same time is efficient in operation and not unduly complicated in construction.

Other objects and advantages of the invention will be apparent from the description thereof set out below, when taken in connection with the accompanying drawing.

In the drawing is illustrated, in side elevation, a form of meat grinder constructed in accordance with this invention, certain parts thereof being broken away and shown in vertical section to more clearly illustrate the details of construction.

As is well known, meat grinders as heretofore used have been provided with a chopper cylinder, having a flaring feed hopper formed integrally with the chopper cylinder and opening directly thereinto. In this construction care must always be taken to prevent the fingers coming in contact with the worm.

As shown in the drawing the chopper cylinder 10 is provided with a hopper receiving neck or flange 11, which extends upwardly a substantial distance from the body of the chopper cylinder and constitutes an inlet thereto. In actual practice this flange or inlet is so proportioned that the outer end of the passage through this receiving flange is about four inches from the nearest point on the worm. The upper part of this passage which is designated by the numeral 12 is substantially cylindrical in shape and is adapted to snugly receive the discharge spout 13 of the pan-shaped hopper 14. The meat to be ground is placed in this hopper 14 and forced downwardly through the discharge spout into the chopper cylinder by using the fingers, or any suitable tool. As stated the flange 11 extends preferably upwardly such a distance that its upper end is some four inches from the nearest point on the worm. In addition, when the hopper 14 is in place this distance is increased an inch or more. And with a distance of four or five inches to the nearest point of the worm it is practically impossible for the fingers of the operator to come in contact with the worm. But the opening through the conventional feed hopper is so large that the entire hand, in many machines can be passed through this opening. In order to prevent this, the passages through the discharge spout of the hopper and through the flange 11 are constricted so that it is impossible to extend the hand down therethrough. The minimum diameter of the passage through the discharge spout 13 is preferably about two to two and one-quarter inches.

It was found that while the provision of a restricted passage four or five inches long, and having a minimum diameter of approximately two and one-quarter inches, functions to practically eliminate accidents to the operator or to others, there was a tendency to retard the free feeding of the meat through said passage. In order to overcome this tendency the lower part of the passage through the flange 11, which is designated by the numeral 15, is flared downwardly. As a result the passage through the flange 11 is restricted at the top sufficiently to prevent extending the fingers downwardly into the path of the worm and the lower part of the passage, because of being flared, facilitates pushing the meat into the path of the worm.

In the ordinary type of meat grinder, as heretofore used, a child standing on the floor can reach up to and down through the feed hopper of conventional construction and into the chopper cylinder. But it is to be noted that the bowl of the feed hopper shown in the drawing and described herein is of unusual width, and this extra width in conjunction with restricted passage through which the meat must be fed to the chopper cylinder, functions so that in order for a child to insert its fingers into contact with the worm in the chopper cylinder it would be necessary for the child to bend its arm in an impossible manner. And so accidents to children around such a form of meat grinder are practically eliminated.

As a result of this construction a meat grinder has been provided in which accidents are practically eliminated and which is nevertheless simple in construction and efficient in operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A meat grinder of the character described comprising a chopper cylinder adapted to receive a worm therein, an inlet secured thereto and having a passage therethrough opening into said cylinder and of a length materially in excess of its width, said passage being of such cross-sectional area at a point relatively distant from said worm as to prevent the adult operator extending his fingers into contact with the worm.

2. A meat grinder of the character described comprising a chopper cylinder adapted to receive a worm therein, an inlet secured to said chopper cylinder and having a passage therethrough opening into said cylinder, said passage being so restricted as to cross-sectional area and of such proportions as to length and cross-sectional area as to prevent the operator extending his fingers therethrough into contact with the worm.

3. A meat grinder of the character described comprising a chopper cylinder adapted to receive a worm therein, an inlet secured to said chopper cylinder and having a passage therethrough of a diameter of approximately two and a quarter inches at a point approximately not less than four inches from the worm, whereby said passage is so proportioned as to length and cross-sectional area as to prevent the adult operator extending his fingers therethrough into contact with the worm.

4. A meat grinder of the character described comprising a chopper cylinder, adapted to receive a worm therein, a hopper receiving flange permanently secured to said chopper cylinder and having a passage therethrough of a length materially in excess of its diameter, said passage being of such proportions as to length and diameter as to prevent the adult operator extending his fingers into contact with the worm, said passage being of restricted substantially cylindrical form at its upper end and flaring gradually downwardly to the chopper cylinder to facilitate the feeding of the meat to the chopper cylinder, and a feeding hopper cooperating with the upper cylindrical part of said passage to receive the meat.

5. A meat grinder of the character described comprising a chopper cylinder, adapted to receive a worm therein, a hopper-receiving flange permanently secured to said chopper cylinder and having an unobstructed passage therethrough of a length materially in excess of its width, said passage being of such proportions as to length and diameter as to prevent the adult operator extending his fingers into contact with the worm, said passage being of restricted substantially cylindrical form at its upper end and the lower portion of said passage flaring downwardly to the chopper cylinder to facilitate the feeding of the food to the chopper cylinder.

6. A meat grinder of the character described comprising a chopper cylinder, adapted to receive a worm therein, a hopper-receiving flange permanently secured to said chopper cylinder and having a passage therethrough of a length approximately twice the width of the said passage, said passage being of such proportions as to length and diameter as to prevent the adult operator extending his fingers into contact with the worm, said passage being of restricted substantially cylindrical form at its upper end and flaring gradually downwardly to the chopper cylinder to facilitate the feeding of the meat to the chopper cylinder, and a pan-shaped feeding hopper having a correspondingly restricted opening cooperating with the upper cylindrical part of said passage.

7. A meat grinder of the character described comprising a chopper cylinder, adapted to receive a worm therein, a hopper-receiving flange permanently secured to said chopper cylinder and having a passage therethrough having a length of approximately twice the width of the said passage, said passage being of such proportions as to length and diameter as to prevent the adult operator extending his fingers into contact with the worm, said passage being of restricted substantially cylindrical form at its upper end and flaring gradually downwardly to the chopper cylinder to facilitate the feeding of the meat to the chopper cylinder, and a broad pan-shaped feeding hopper having a correspondingly restricted opening cooperating with the upper cylindrical part of said passage, the said passage and the cooperating opening in the hopper being substantially unobstructed.

8. A meat grinder of the character described comprising a chopper cylinder, adapted to receive a worm therein, a hopper-receiving flange permanently secured to said chopper cylinder and having a passage therethrough, said passage being of a length approximating twice the width thereof and being of such proportions as to length and diameter as to prevent the adult operator extending his fingers into contact with the worm, said passage being of restricted substantially cylindrical form at its upper end and flaring gradually downwards to the chopper cylinder to facilitate the feeding of the food to the chopper cylinder, and a pan-shaped feeding hopper having a cylindrical stem fitted within the cylindrical part of the flange, said stem extending into said flange to the point of flare and provided with a bore of more restricted cross-sectional area than the flange.

In testimony whereof I hereto affix my signature.

HERBERT L. JOHNSTON.